(12) United States Patent
Kim et al.

(10) Patent No.: US 8,451,241 B2
(45) Date of Patent: May 28, 2013

(54) LIQUID CRYSTAL DISPLAY DEVICE

(75) Inventors: Cheol-Se Kim, Daegu (KR); Ji-Hyun Jung, Gumi-si (KR); Min-Jae Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 364 days.

(21) Appl. No.: 12/836,428

(22) Filed: Jul. 14, 2010

(65) Prior Publication Data

US 2011/0096021 A1 Apr. 28, 2011

(30) Foreign Application Priority Data

Oct. 23, 2009 (KR) .................. 10-2009-0101091

(51) Int. Cl.
*G06F 3/045* (2006.01)

(52) U.S. Cl.
USPC ............. 345/173; 345/92; 345/102; 345/104; 345/176; 345/207; 715/702; 715/740; 178/18.01; 178/18.09; 434/322; 434/364; 362/97.2

(58) Field of Classification Search
USPC ................... 345/156, 173, 174, 102, 175, 87, 345/104, 176, 207; 349/12, 42, 64; 178/18.01–18.11; 715/702, 740; 362/97.1–97.3
See application file for complete search history.

(56) References Cited

U.S. PATENT DOCUMENTS

| | | | |
|---|---|---|---|
| 2003/0020170 A1* | 1/2003 | Jeong et al. | 257/762 |
| 2005/0230719 A1* | 10/2005 | Aoki et al. | 257/291 |
| 2007/0296688 A1* | 12/2007 | Nakamura et al. | 345/102 |
| 2008/0048995 A1* | 2/2008 | Abileah et al. | 345/173 |
| 2008/0122803 A1* | 5/2008 | Izadi et al. | 345/175 |
| 2009/0153056 A1* | 6/2009 | Chen et al. | 315/51 |

FOREIGN PATENT DOCUMENTS

| | | |
|---|---|---|
| KR | 10-2008-0000411 | 1/2008 |
| WO | WO 2009/110294 A1 | 9/2009 |

* cited by examiner

*Primary Examiner* — Lun-Yi Lao
*Assistant Examiner* — Md Saiful A Siddiqui
(74) *Attorney, Agent, or Firm* — McKenna Long & Aldridge, LLP (57) ABSTRACT

Disclosed is a liquid crystal display device to realize soft touch and sense touch regardless of illumination of external light or reflected light. The liquid crystal display device includes a liquid crystal panel including a first substrate and a second substrate facing each other, wherein a liquid crystal layer is interposed between the first substrate and the second substrate, an infrared sensor arranged on the first substrate, an infrared filter arranged corresponding to the infrared sensor arranged on the second substrate facing the first substrate, a first polarizing plate adhered to the back surface of the first substrate, a second polarizing plate adhered to the back surface of the second substrate, a light guiding plate arranged under the first polarizing plate, a first light source arranged on one side of the light guiding plate to emit white light, and a second light source arranged on the other side of the light guiding plate to emit infrared light to the light guiding plate.

11 Claims, 9 Drawing Sheets

RELATED ART

LIQUID CRYSTAL DISPLAY DEVICE

This application claims the benefit of Korean Patent Application No. 10-2009-101091, filed on Oct. 23, 2009, which is hereby incorporated by reference as if fully set forth herein.

BACKGROUND OF THE INVENTION

1. Field of the Invention

The present invention relates to a liquid crystal display device and more specifically to a liquid crystal display device to realize soft touch and sense touch regardless of illumination of external light or reflected light.

2. Discussion of the Related Art

In accordance with the recent information-dependent society, displays to visualize electric information signals have been rapidly developed. Various slim, lightweight, and low-power flat display devices are commonly used as alternatives to conventional cathode ray tubes (CRTs).

Examples of flat display devices include liquid crystal display devices (LCDs), plasma display panel devices (PDPs), field emission display devices (FEDs), electro luminescence display devices (ELDs) and the like. These flat display devices necessarily require a flat display panel to realize an image wherein the flat display panel has a structure in which a pair of transparent insulating substrates is joined such that an inherent luminous or polarized material layer is interposed between the substrates. Among flat display devices, liquid crystal display devices control light transmittance of liquid crystals using an electric field to display an image. For this purpose, an image display device includes a display panel including liquid crystal cells, a backlight unit to irradiate light to the display panel and an operation circuit to operate liquid crystal cells.

The display panel is formed such that a plurality of gate lines cross a plurality of data lines to define a plurality of unit pixel regions. Each pixel region includes a thin film transistor array substrate and a color filter array substrate facing each other, a spacer interposed between the two substrates to maintain a predetermined cell gap, and a liquid crystal filled in the cell gap.

The thin film transistor array substrate includes a plurality of gate lines and a plurality of data lines, a thin film transistor formed as a switching device at each intersection between the gate line and the data line, a pixel electrode arranged in each liquid crystal cell and connected to the thin film transistor, and an orientation film coated on the resulting structure. The gate lines and data lines receive signals through respective pad portions from operation circuits.

In response to scan signals supplied to the gate lines, the thin film transistor transfers pixel voltage signals supplied to data lines to the pixel electrode.

In addition, the color filter array substrate includes color filters arranged in respective liquid crystal cells, a black matrix to partition the color filters and reflect external light, a common electrode to supply a reference voltage to the liquid crystal cells, and an orientation film coated on the resulting structure.

The thin film transistor substrate and the color filter array substrate thus separately formed are arranged and then joined such that the two substrates face each other, liquid crystal is injected into a region provided between the substrates, and the region is sealed, to complete fabrication of the liquid crystal display device.

Meanwhile, the liquid crystal display device is a positive light-emitting device, which controls luminance of screen using light from the backlight unit arranged on the back surface of the liquid crystal panel.

Recently, technologies for adhering a touch screen panel onto such a liquid crystal display device were suggested. The touch screen panel refers to a user interface which is generally adhered to the display device and undergoes variations in electric properties thereof at a touch position contacting a non-transparent material such as a finger or a pen to sense the touch position. Touch screen panel-adhered liquid crystal display devices detect information of a position at which a finger of user or a touch pen contacts a screen, and realize a variety of applications based on the detected information.

However, such a liquid crystal display device has various disadvantages of increased production costs due to the touch screen panel, decreased yield due to processes for adhering the touch screen panel to the liquid crystal panel, and deteriorated luminance and increased thickness of the liquid crystal panel.

In order to solve these disadvantages, a great deal of attempts have been made to form a photosensor inside a display panel, and thereby control the backlight unit according to the luminance of external light and solve the increased volume of the photosensor adhered onto the external surface of the display panel.

Hereinafter, a related art liquid crystal display device will be described with reference to the annexed drawings.

Figure 1:
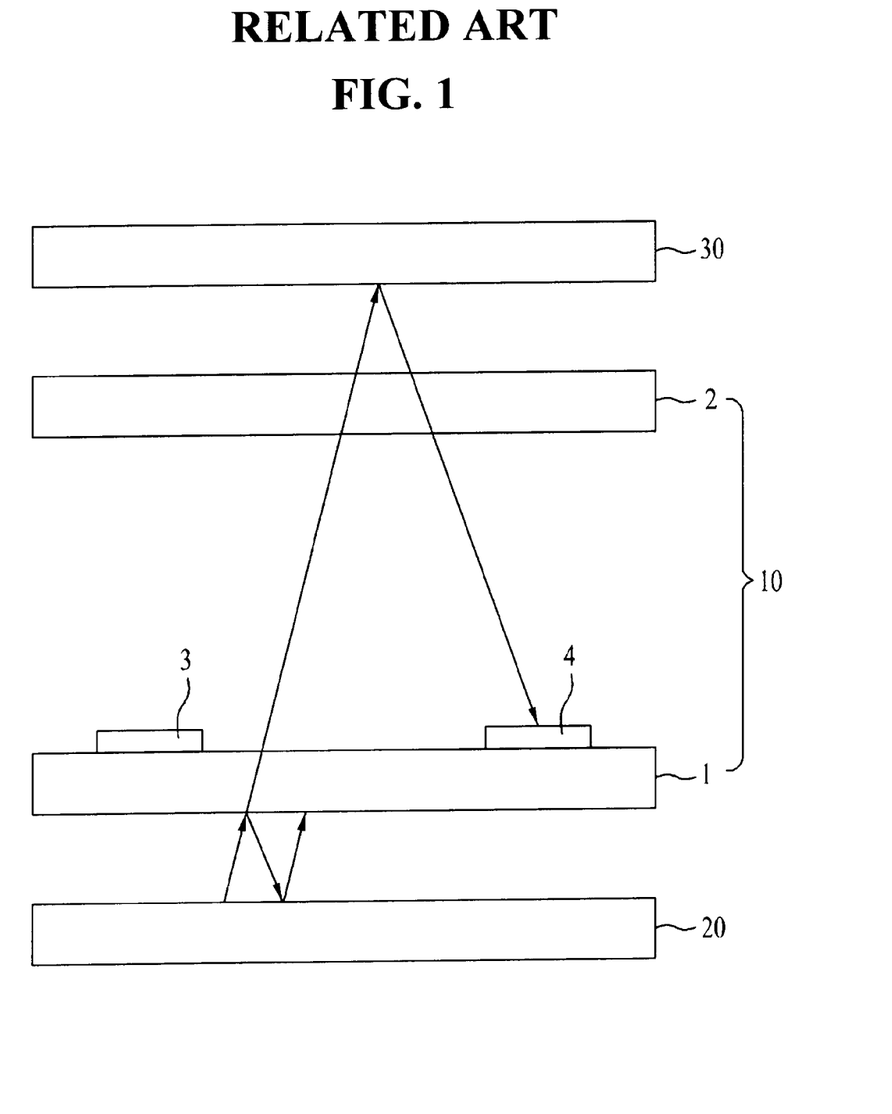
FIG. 1 is a schematic sectional view illustrating a related art liquid crystal display device provided with a photo-type touch panel.

FIG. 1 is a schematic sectional view illustrating a general liquid crystal display device provided with a photo-sensing type touch panel.

As shown in FIG. 1, a related art liquid crystal display device provided with a photo-sensing type touch panel includes a liquid crystal panel 10 including a first substrate 1 and a second substrate 2 which face each other, a pixel transistor (pixel TFT) 3 arranged on the first substrate 1, a sensing transistor (sensor TFT) 4, and a backlight unit 20 arranged under the liquid crystal panel 10 to the liquid crystal panel 10 to transfer light to the liquid crystal panel 10.

In addition, the photo-sensing is realized through the following mechanism. When light is emitted from the backlight unit 20 through the liquid crystal panel 10 and the liquid crystal panel is then touched by a finger or another material 30, light to be emitted is reflected to the liquid crystal panel 10 again and a sensing transistor senses the light.

This related art liquid crystal display device provided with a photo-sensing type touch panel senses touch based on a reflection level of external light, thus greatly varying touch sensitivity depending on illumination of the external light. For example, when there is no or almost no difference between external light and shielded portion upon touch, touch sensation cannot be realized.

The related art liquid crystal display device provided with a touch panel has the following disadvantages.

First, the related art touch panel-integrated liquid crystal display device senses light reflected from a backlight upon touch as well as external light, thus allowing a sensor to fail to accurately sense input signals, when there is almost no difference between reflected light and external light.

Second, input signals upon touch are varied depending on external environment, thus complicating algorithms for position detection and causing high possibility of malfunction. That is, when illuminance of external light is higher than that of reflected light, signals upon touch are output at a voltage lower than that of the neighboring region, and on the other hand, when illuminance of external light is lower than that of reflected light, touch signals generate a voltage higher than that of the neighboring region, making it difficult to sense the actual touch signals. For example, when an external environment is under high illumination, although a touch material such as fingers does not touch the liquid crystal panel, shadows generated by the external light may be disadvantageously mistaken as actual touch.

SUMMARY OF THE INVENTION

Accordingly, the present invention is directed to a display device that substantially obviates one or more problems due to limitations and disadvantages of the related art.

It is one object of the present invention to provide a liquid crystal display device to realize soft touch and sense touch regardless of illumination of external light or reflected light.

It is another object of the present invention to provide a method for fabricating a liquid crystal display device to realize soft touch and sense touch regardless of illumination of external light or reflected light.

To achieve these objects and other advantages and in accordance with the purpose of the invention, as embodied and broadly described herein, provided is a liquid crystal display device including: a liquid crystal panel including a first substrate and a second substrate facing each other such that a liquid crystal layer is interposed between the first substrate and the second substrate; an infrared sensor arranged on the first substrate, an infrared filter arranged corresponding to the infrared sensor arranged on the second substrate facing the first substrate; a light guiding plate arranged under the first substrate; a first light source arranged on one side of the light guiding plate to emit white light; and a second light source arranged on the other side of the light guiding plate to emit infrared light to the light guiding plate.

The infrared sensor may sense amount of infrared light reflected upon touch of the second substrate through the infrared filter, with respect to infrared light emitted from the second light source.

The first substrate may include: a plurality of gate lines and a plurality of data lines crossing each other; a pixel transistor arranged at each intersection of the gate line and the data line; a common line and a sensing line arranged parallel to the gate line; and a read-out line arranged parallel to the data line. The infrared sensor is formed between the common line, the sensing line and the read-out line.

The infrared sensor may include: a sensing transistor connected to one side of the common line, the sensing transistor receiving reflected infrared light upon touch, to allow photocurrent to flow through the sensing transistor; an infrared sensing capacitor arranged between the sensing transistor and the common line, the infrared sensing capacitor charged by the photo-current flowing through the sensing transistor; and a switching transistor interposed between the infrared sensing capacitor and the read-out line, the switching transistor receiving an operation signal from the sensing line and being switched, the switching transistor transferring electric charges charged from the sensing capacitor to the read-out line.

The sensing transistor may include: a shielding pattern in the same layer as the gate line on the first substrate; a semiconductor layer comprising a stack-structure including an amorphous silicon layer and an impurity layer formed by interposing a gate insulating film on the shielding pattern; a source electrode and a drain electrode at both sides of the semiconductor layer, in the same layer as the data line; and a gate electrode arranged on an interlayer film covering the data line, the source electrode and the drain electrode. The gate electrode may be electrically connected to a first signal-applied line.

The sensing transistor may include: a gate electrode in the same layer as the gate line on the first substrate; a semiconductor layer including a first semiconductor layer pattern and a second semiconductor layer pattern arranged on the first semiconductor layer pattern, wherein the first semiconductor layer pattern is formed by interposing an insulation film covering the data line on the gate electrode and is composed of a combination of an amorphous silicon layer and a first impurity layer, and the second semiconductor layer pattern is a second impurity layer; and a source electrode and a drain electrode arranged at both sides of the semiconductor layer. The second impurity layer and the first impurity layer may include identical impurities. The second impurity layer may be formed only in the source electrode and the drain electrode.

The second substrate may include: a black matrix layer formed as a matrix in a non-pixel region; and a red pigment layer, a green pigment layer and a blue pigment layer arranged between the black matrix layer. The infrared filter may include a stack-structure of at least two or more of the red pigment layer, the green pigment layer and the blue pigment layer. The second light source may always operate in an on-state. The second light source may be synchronized with an operation signal of the sensing line.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and along with the description serve to explain the principle of the invention. In the drawings.

DETAILED DESCRIPTION OF THE INVENTION

Hereinafter, a liquid crystal display device and a method for fabricating the same according to the present invention will be described with reference to the annexed drawing in detail.

Figure 2:
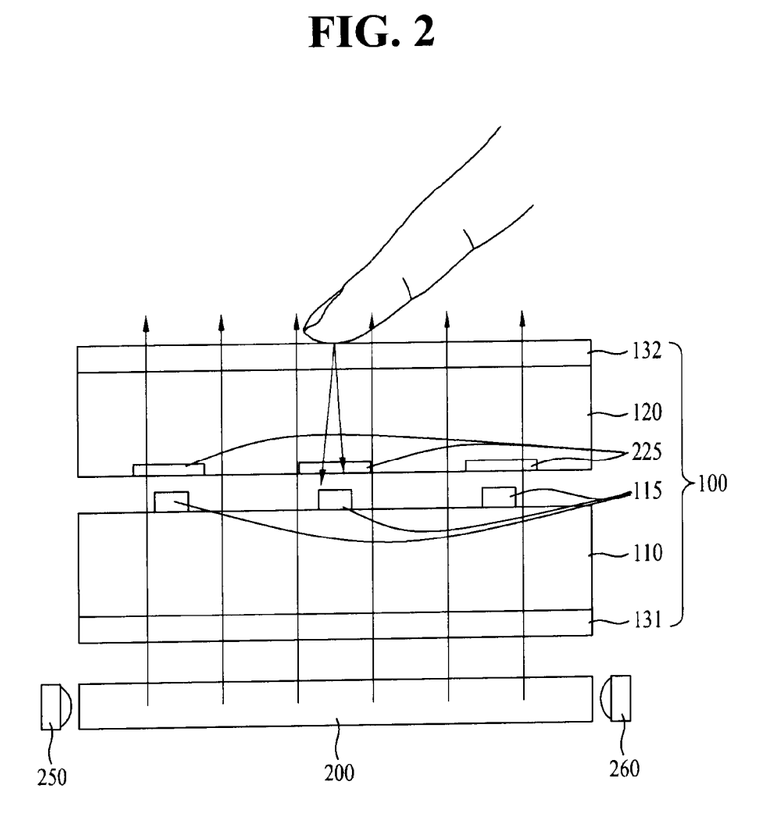
FIG. 2 is a sectional view illustrating a liquid crystal display device according to the present invention.

FIG. 2 is a sectional view illustrating a liquid crystal display device according to the present invention.

As shown in FIG. 2, the liquid crystal display device comprises a liquid crystal panel 100 including a first substrate 110 and a second substrate 120 which face each other, a liquid crystal layer 150 interposed between the first substrate 110 and the second substrate 120, an infrared sensor 115 arranged on the first substrate 100, an infrared filter 225 arranged corresponding to the infrared sensor 115 on the second substrate 120, a first polarizing plate 131 adhered to the back surface of the first substrate 110, and a second polarizing plate 132 adhered to the back surface of the second substrate 120, a light guiding plate 200 arranged under the first polarizing plate 131, a first light source 250 arranged on one side of the light guiding plate 200 to emit white light, and a second light source 260 arranged on the other side of the light guiding plate 200 to emit infrared light.

The first light source 250 may be a white light-emitting diode (LED) or be a combination of a red LED, a green LED and a blue LED to emit white light. Such a first light source 250 may be plural in number and arranged corresponding to one side of the light guiding plate 200. Also, the light guiding plate 200 receives white light from the side through the first light source 250, and scatters the light to transfer the light to an upper region where the liquid crystal panel 100 is arranged.

The second light source 260 includes an infrared light emitting diode (IR LED) to emit infrared light through the light guiding plate 200 arranged in a lower region of the liquid crystal panel 100. The second light source 260 may be arranged in the form of a separate array opposite to the first light source 250 as shown in FIG. 2, or may be interposed between first light sources 250 to emit white light.

Meanwhile, the second light source 260 may maintain an on-state to continuously emit light or be synchronized with an operation signal of the infrared sensor 115 to perform pulsed operation. Specifically, the second light source 260 may be synchronized with on-signals of a sensing line connected to the gate electrode of a switching transistor in the side of the infrared sensor 115, as illustrated below.

The infrared sensor 115 senses difference in reflected light amount entering the liquid crystal panel 100 through a touching material (input device such as a finger or a pen) arranged on the first substrate 110. For example, the infrared sensor 115 may take the form of a transistor having a semiconductor layer including an amorphous silicon thin film, and the infrared sensor 115 senses optical current flowing through the semiconductor layer present therein, when reflected light is generated.

In addition, the infrared filter 225 may be a stack-structure of at least two or more different colors of pigments selected from R, G and B pigments. The infrared filter 225 blocks light emitted from the external source or blocks reflected light, when the surface of the liquid crystal panel 100 is touched.

The blocked light is not in the range of all wavelengths, but is in the range of wavelengths shorter than visible light. After passing though the infrared filter 225, only light having wavelengths longer than infrared light is transferred to the lower region of the infrared filter 225 and sensed by the infrared sensor 115.

Operation principal of such a liquid crystal display device is as follows:

When a predetermined portion on the surface of the liquid crystal panel 100 is touched by an input means, infrared light emitted from the lower second light source 260 is reflected on the input means and the resulting reflected light passes through the infrared sensor 115 and is then sensed through the infrared filter 225 to detect the touched portion.

Hereinafter, formation of an infrared filter in the liquid crystal display device according to one embodiment of the present invention will be described in detail.

Figure 3A:
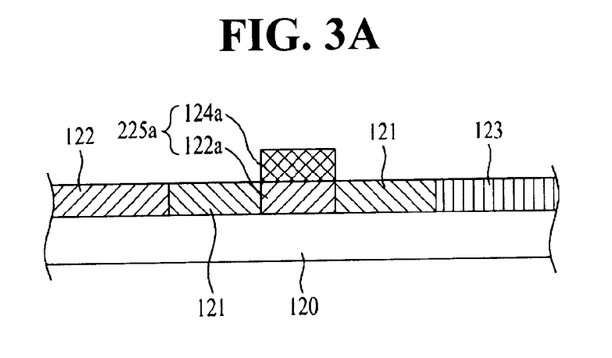
FIGS. 3A and 3B are sectional views illustrating an infrared filter of FIG. 2 according to one embodiment.
Figure 3B:
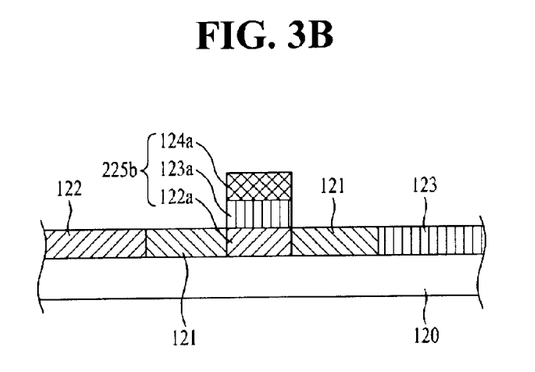

FIGS. 3A and 3B are sectional views illustrating an infrared filter of FIG. 2 according to one embodiment.

As shown in FIG. 3A, the infrared filter 225a has a stack-structure of first and second layer 122a and 124a with two different colors of filter pigments on the second substrate 120. The infrared filter 225a may be formed by laminating two color filters selected from a first color pigment 122, a second color pigment 123 and a third color pigment (not shown). In an example, the first layer 122a may be formed while coating the first color pigment 122, and the second layer 124a may be formed while coating the third color pigment. At this time, the first color pigment 122 may be formed together with the first layer 122a of the infrared filter 225a, and the third color pigment may be formed together with the third color pigment 124a.

Also, the first color pigment 122, the second color pigment 123 and the third color pigment may be selected from R, G and B color pigments.

In this regard, to form the first to third color pigments (122, 123 and not shown), first, a black marix layer 121 is formed in a non-pixel region on the second substrate 120.

Then the first to third color pigments may be formed in only pixel regions, or, if necessary, be formed in the pixel regions or regions adjacent thereto such that they partially overlap the black marix layer 121.

Also, the infrared filter 225a may be formed such that it does not overlap the black marix layer 121, and completely blocks visible light due to lamination of different color pigment layers.

As shown in FIG. 3B, comparing the afore-mentioned structure in FIG. 3A, the infrared filter 225b according to another embodiment is charaterized in that three different colors of pigments 122a, 123a and 124a are used, instead of two different colors of pigments. The infrared filter 225b is formed by sequentially laminating the same materials 122a, 123a and 124a as the first to third color pigments in regions of the second substrate 120 corresponding to the infrared sensor 115.

Figure 4:
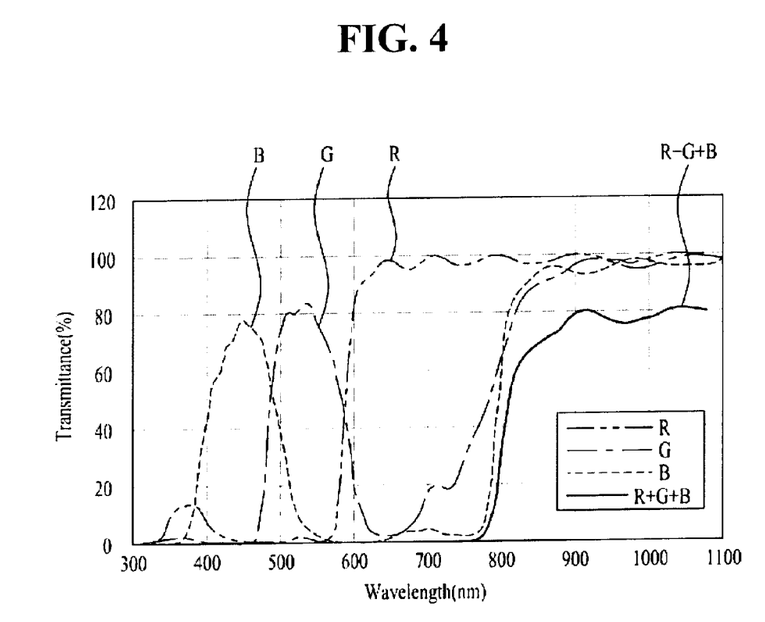
FIG. 4 is a graph showing transmittance of the infrared filter of FIG. 3B as a function of wavelength with respect to R, G and B pigments and a combination thereof.

FIG. 4 is a graph showing transmittance of the infrared filter of FIG. 3B, as a function of wavelength with respect to R, G and B pigments and a combination thereof.

As shown in FIG. 4, the blue pigment transmits light in the range of blue light of 370 to 550 nm, in the range of infrared light of 770 nm or longer, the green pigment transmits light in the ranges of green light of 470 to 650 nm and 650 nm or longer and the red pigment transmits light in the range of red light of 570 nm or longer.

As can be seen from the graph of FIG. 4, each pigment transmits light in the range of visible light or infrared light corresponding to color thereof.

Also, as shown in FIG. 3B, when the infrared filter 225b according to another embodiment takes the form of a stack-structure of red, green and blue pigments, it has a transmittance of about 0% in the range of visible light, which means that visible light is blocked, and has a transmittance of about 80% in the infrared range of 780 nm or higher.

Although not shown, like the infrared filter 225a of FIG. 3A, the laminate of two different color pigments exhibits the highest transmittance in the range of infrared light, although transmittance thereof may vary depending on transmittance levels and wavelengths.

As shown in FIG. 3A, when the infrared filter 225 is made of two different color pigments and at least one of the pigments exhibits low transmittance at a specific wavelength, the infrared filter 225 has low transmittance at the specific wavelength. The color pigments constituting the infrared filter 225a may be red and blue pigments. This is the reason that, since the red pigment has transmittance of about 0 at a wavelength of 570 nm or shorter, the blue pigment has transmittance of about 0 at a wavelength of 570 nm to 780 nm and at a wavelength less than 370 nm, the laminate including red and blue pigments enables blocking of visible light of about 780 nm or less.

That is, as can be seen from the graph, the infrared filter 225 composed of a stack-structure of different color pigments blocks visible light but does not block infrared light.

Figure 5:
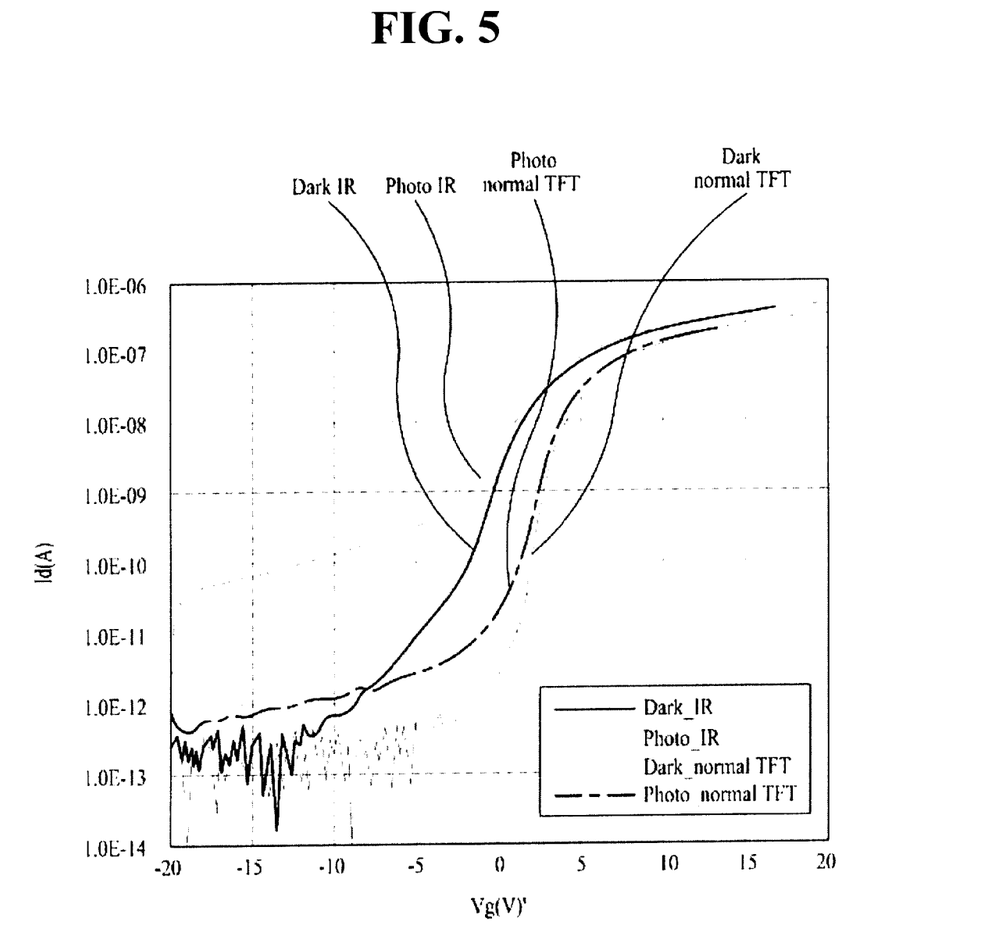
FIG. 5 is a graph showing photocurrent of a sensing transistor of the present invention and a general photosensor.

FIG. 5 is a graph showing photocurrent of a sensing transistor and a general photosensor.

FIG. 5 shows drain current as a function of applied voltage, for a touch-sensing infrared sensor (photo IR), dark infrared sensor (dark IR), photo normal TFT and dark normal TFT, with respect to the liquid crystal display device in FIG. 2 according to the present invention utilizing an infrared LED having a central wavelength of 870 nm as the second light source 260.

The normal transistor means a general pixel transistor in a pixel region, which may be affected by external light, but the corresponding region does not selectively receive infrared light due to the absence of an infrared filter.

The normal transistor may sense external light or reflected light on the surface of the liquid crystal panel 100. Upon light sensing, difference in light amount between the photo normal TFT and the dark normal TFT may occur. That is, photo TFTs exhibit improved current properties due to generation of photocurrent, as compared to dark TFTs.

On the other hand, as can be seen from the graph, the infrared (IR) sensor provided in the liquid crystal display device exhibits improved photocurrent properties in both photo TFT and dark TFT, as compared to the afore-mentioned normal transistor. In particular, upon touch sensing, the photo infrared sensor of the present invention exhibits considerably improved photocurrent, as compared to the afore-mentioned photo and dark IRs of the general transistor.

This is the reason that sensitivity of the transistor constituting the infrared sensor is higher than that of normal transistors, and that the infrared ray (IR) sensor is provided with considerable infrared filters at side thereof, to receive only reflected infrared light generated upon touching.

The present invention utilizes an infrared sensor with the afore-mentioned voltage-current (Vg-Id) properties, thus exhibiting superior touch sensing rate and thus touch sensitivity due to great difference in current between dark-state and photo-state, depending on the sensed level of reflected light.

Hereinafter, a circuit configuration of the liquid crystal display device according to the present invention will be described in detail.

Figure 6:
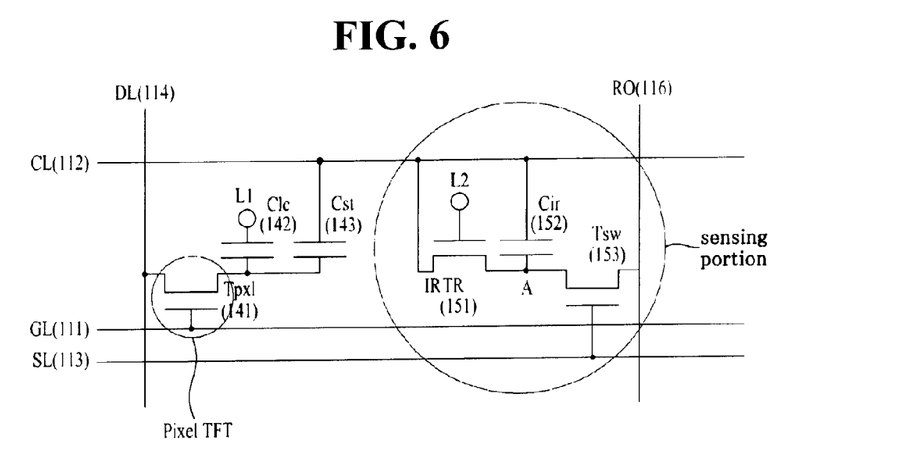
FIG. 6 is a circuit view of a pixel including a sensing portion of the liquid crystal display device according to the present invention.

FIG. 6 is a circuit view of a pixel including a sensing portion of the liquid crystal display device according to the present invention.

As shown in FIG. 6, the pixel including a sensing portion in the liquid crystal display device include s a gate line (GL) 111 and a data line DL 114 which cross each other to define a pixel region on the first substrate 110, a transistor (Tpxl) 141 arranged at the intersection between the gate line (GL) 111 and the data line (DL) 114, a pixel electrode (represented by reference numeral "118" in FIGS. 7A and 7B) connected to the pixel transistor (Tpxl) 141 in the pixel region, a common line (CL) 112 arranged parallel to the gate line (GL) 111, a storage capacitor (Cst) 143 arranged between the pixel electrode and the common line 112, and a liquid crystal capacitor (Clc) 142 defined by a liquid crystal layer (L1) interposed between the pixel electrode and a common electrode.

In addition, the pixel further includes a sensing line (SL) 113 parallel to the gate line GL 111 and a read-out line (RO) 116 parallel to the data line DL 114 arranged adjacent to the pixel region, and a sensing portion to sense touch defined in a region provided between the sensing line 113, the common line 112 and the read-out line (RO) 116.

The sensing portion includes an infrared sensor 151 interposed between the common line 112 and a node A, an infrared capacitor (Cir) 152 interposed between the node A and the common line (CL) 112, and a switching transistor (Tsw) 153 arranged between the node A, the sensing line (SL) 113 and the read-out line (RO) 116.

The infrared sensor 151 may be formed of a transistor having a structure wherein a gate electrode is connected to a first signal-applied line (L2), a source electrode is connected to the common line 112, and the drain electrode is connected to the node A.

Also, the switching transistor (Tsw) 153 has a structure wherein the gate electrode is connected to the sensing line (SL) 113, the source electrode is connected to the node A, and the drain electrode is connected to the read-out line (RO) 116.

The infrared sensor 151 senses infrared light reflected from a touched region through the infrared filter 225 when infrared light is transmitted through the liquid crystal panel 100 from the lower second light source 260. When reflected light is generated upon touching, although negative voltage is applied to the first signal-applied line (SL) connected to the gate electrode, photocurrent is generated, high drain current (Id) flows, and capacitance is charged in the infrared capacitor (Cir) 152 connected to the infrared sensor 151. Also, when charge in the infrared capacitor (Cir) 152 is discharged to the node A, the sensing line (SL) 113 allows considerable electron charges corresponding to the capacitance according to turn-on signals to be transferred through the switching transistor (Tsw) 153 to the read-out line (RO) 116 and the read-out line (RO) 116 then detects a predetermined voltage. In this case, to increase detection sensitivity, an amplifier may be further provided at one end of the read-out line (RO) 116.

The sensing portion may be provided in each pixel. Preferably, at least one sensing portion may be provided in considerable pixels in a minimum region touched by a touching material.

Hereinafter, the pixel transistor (Tpxl) 141 in the afore-mentioned pixel region and the infrared sensor 151 will be described in detail.

Figure 7A:
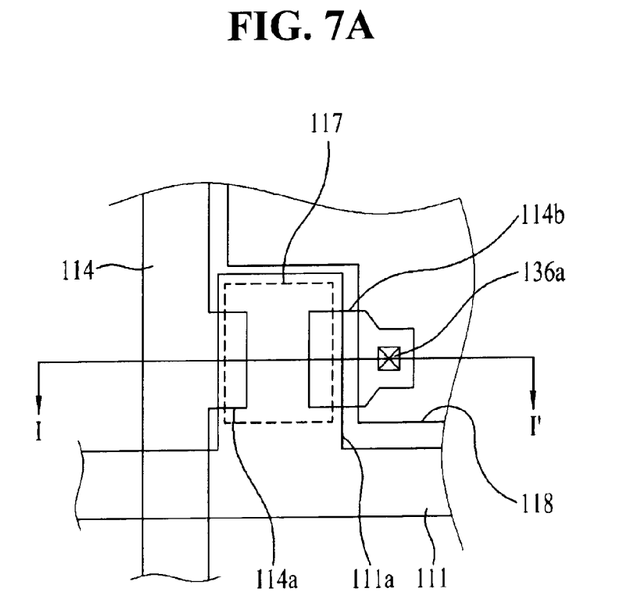
FIGS. 7A and 7B are plan and sectional views of the pixel transistor of FIG. 6, respectively.
Figure 7B:
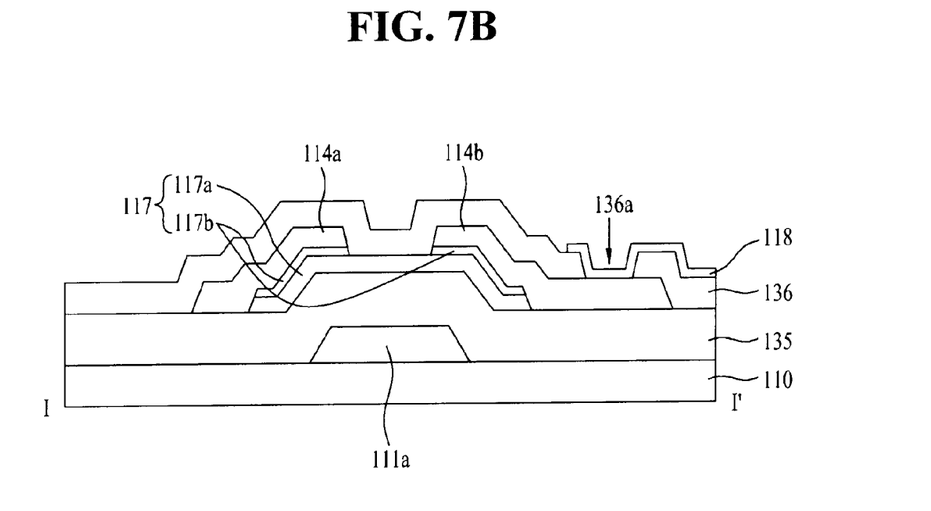
Figure 8A:
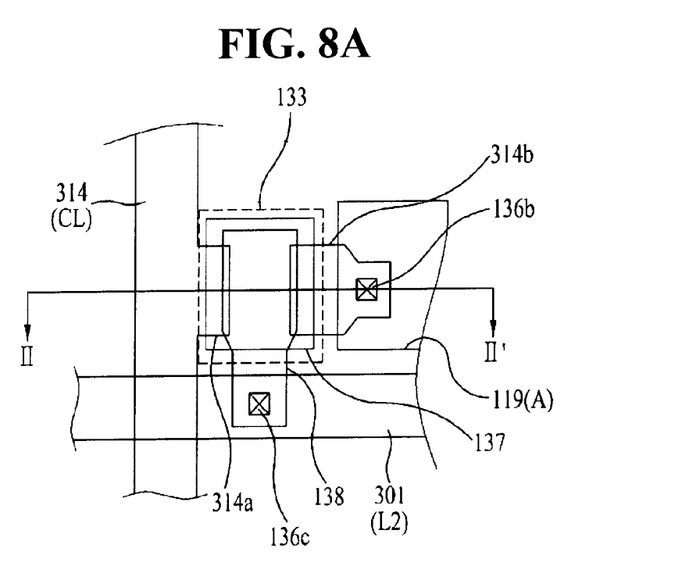
FIGS. 8A and 8B are plan and sectional views of the sensing transistor of FIG. 6, respectively.
Figure 8B:
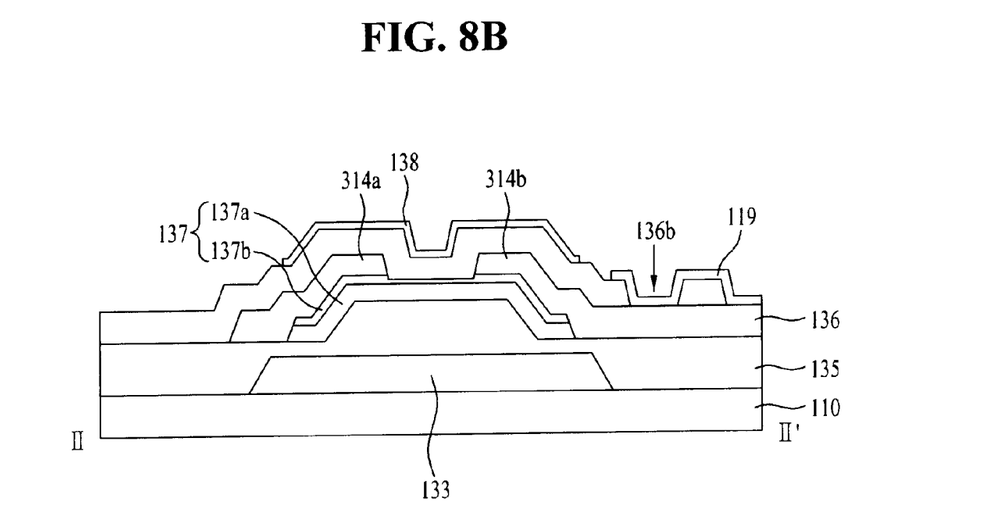

FIGS. 7A and 7B are plan and sectional views of the pixel transistor of FIG. 6, respectively. FIGS. 8A and 8B are plan and sectional views of the sensing transistor of FIG. 6, respectively.

The pixel transistor and the infrared sensor are formed together with the thin film transistor on the first substrate 110.

First, the structure of the pixel transistor will be described with reference to FIGS. 7A and 7B.

The pixel transistor includes a gate electrode 111a protruding from the gate line 111 on the first substrate 110, a source electrode 114a protruding from the data line 114 crossing the gate line 111, a drain electrode 114b spaced from the source electrode 114a, and a semiconductor layer 117 formed by interposing a gate insulating film 135 which contacts the source electrode 114a and the drain electrode 114b and covers the gate electrode 111a.

The drain electrode 114b contacts a pixel electrode 118, wherein an interlayer film 136 is interposed, through a first contact hole 136a.

Also, the semiconductor layer 117 has a stack-structure including a lower portion composed of an amorphous silicon layer 117a and an upper portion composed of an impurity layer 117b with n+ type.

The structure of the sensing transistor will be described with reference to FIGS. 8A and 8B.

As shown in FIGS. 8A and 8B, the sensing transistor includes a first substrate 110, a shielding pattern 133 arranged in the form of an island thereon, a gate insulating film 135 arranged over the entire surface of the first substrate 110 including the shielding pattern 133, a semiconductor layer 137 corresponding to the shielding pattern 133 on the gate insulating film 135, a source electrode 314a and a drain electrode 314b arranged at both sides of the semiconductor layer 137, and a gate electrode 138 electrically connected to a first signal-applied line (L2) 301 on a protective film 136 arranged on the gate insulating film 135 including the source/drain electrodes 314a/314b.

The gate electrode 138 may be arranged within the width of the shielding pattern 133 and is a transparent electrode composed of the same material as the pixel electrode 118.

In addition, the shielding pattern 133 is composed of a light-shielding metal in the same layer as the gate line 111 and shields light emitted to a lower region so that the light does not affect the semiconductor layer 137.

In addition, the semiconductor layer 137 includes an amorphous silicon layer 137a and an impurity layer 137b arranged on the amorphous silicon layer 137a, and the impurity layer 137b is thickly formed only under the source/drain electrodes 314a/314b, and is partially etched to a predetermined thickness in a region (channel) between the source electrode 314a and the drain electrode 314b. This thickness behavior aims to provide a negative threshold voltage in order to increase sensitivity of the sensing transistor.

Meanwhile, the drain electrode 314b is provided with a second contact hole 136b in the protective film 136 to contact a metal pattern 119 corresponding to the node A.

As illustrated above, comparing the pixel transistor, the sensing transistor present in the sensing portion is provided with the pixel transistor and another semiconductor layer in order to improve reception sensitivity of reflected infrared light. Hereinafter, preferred embodiments of the pixel transistor and another semiconductor layer will be given below.

Figure 9A:
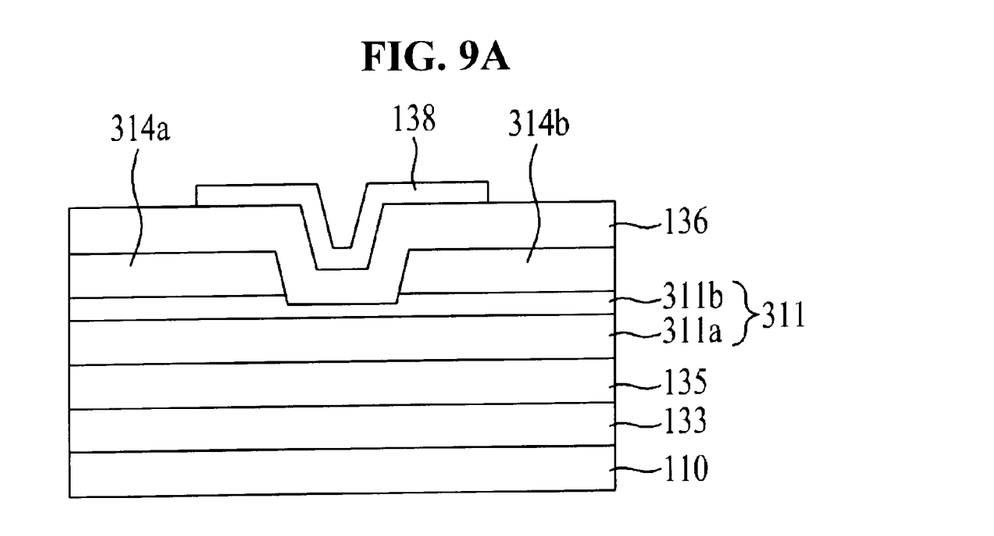
FIGS. 9A to 9C are sectional views of sensing transistors according to embodiments of the present invention.
Figure 9B:
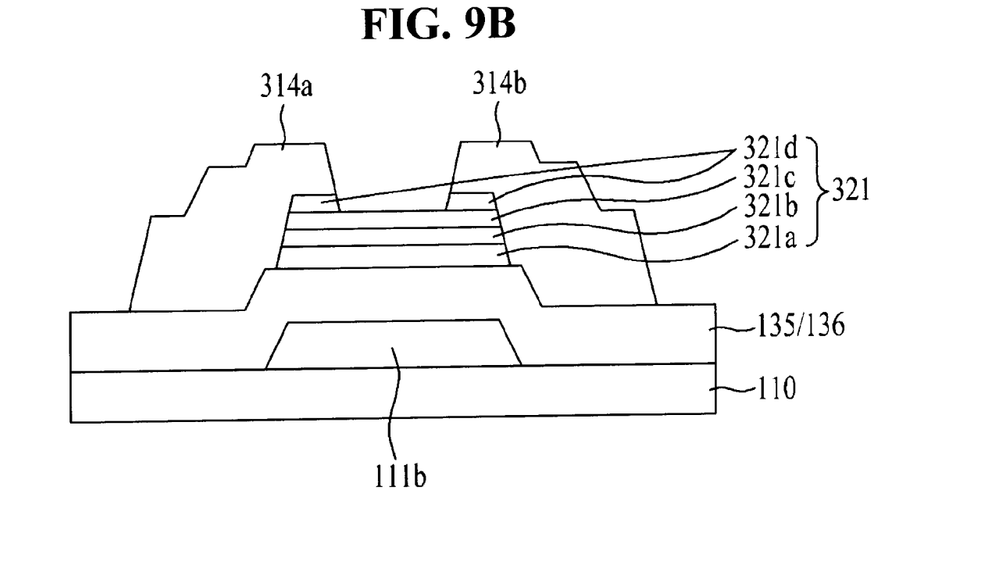
Figure 9C:
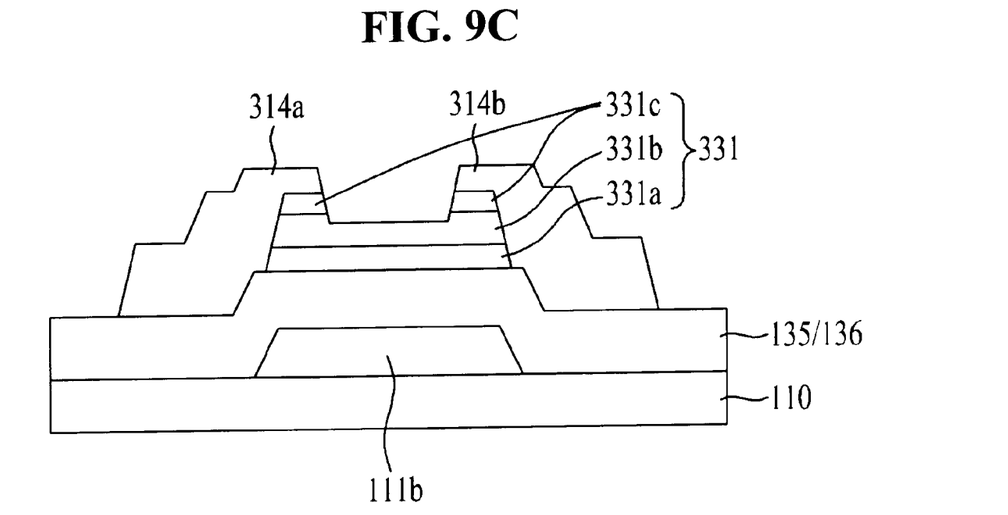

FIGS. 9A to 9C are sectional views of sensing transistors according to embodiments of the present invention.

FIG. 9A illustrates a top gate-type sensing transistor illustrated in FIGS. 8A and 8B. The semiconductor layer 311 includes an amorphous silicon layer 311a and an impurity layer 311b arranged on the amorphous silicon layer 311a, the impurity layer 311b is thick only under the source and drain electrodes 314a and 314b and is partially etched in a region (channel) provided between the source electrode 314a and the drain electrode 314b.

The widths of the gate electrode 138, the shielding pattern 133, the semiconductor layer 311 and the source/drain electrodes 314a/314b illustrated in FIG. 8A are different from those in FIG. 8B, but widths of remaining patterns or electrodes may be varied under the condition that the shielding pattern 133 is larger than the semiconductor layer 311.

FIGS. 9B and 9C illustrate a bottom gate-type sensing transistor. These transistors are distinguished from each other, depending on whether or not the semiconductor layer 321 or 331 includes four layers or three layers.

As shown in FIG. 9B, the semiconductor layer 321 includes a fourth layer 321d, a high-concentration impurity layer, and the remaining first to third layers 321a to 321c composed of two amorphous silicon layers and an impurity layer.

For example, the first to third layers 321a to 321c may have one structure of the following three cases: n (impurity layer)/i(amorphous silicon layer)/i(amorphous silicon layer); i(amorphous silicon layer)/n(impurity layer)/i(amorphous silicon layer); and i(amorphous silicon layer)/i(amorphous silicon layer)/n(impurity layer). The impurity layer may be formed by doping impurities in an amount equivalent to or lower than a high-concentration of the fourth layer 321d.

At this time, the third layer 321c has a thin portion provided between the source/drain electrodes 314a/314b and may thus have the same width as the fourth layer 321d.

As shown in FIG. 9C, the semiconductor layer 331 has a stack-structure structure including first to third layers 331a to 331c, wherein the first layer 331a is an n+-layer (high-concentration impurity layer), the second layer 331b is an amorphous silicon layer (intrinsic) and the third layer 331c is an n+ layer (high-concentration impurity layer), wherein the third layer 331c is removed to an entire thickness and the second layer 331b is removed to a partial thickness between the source/drain electrodes 314a/314b.

Here, the gate electrode 111b shown in FIGS. 9B and 9C protrudes from the second signal-applied line (L2) or is connected to the same through an additional connection line so that it can be electrically connected to the second signal-applied line (L2).

The sensing transistor shown in FIGS. 9B and 9C improves sensitivity of photocurrent and defines an additional semiconductor layer, and the semiconductor layer is formed in a subsequent process separately from the pixel transistor.

Figure 10A:
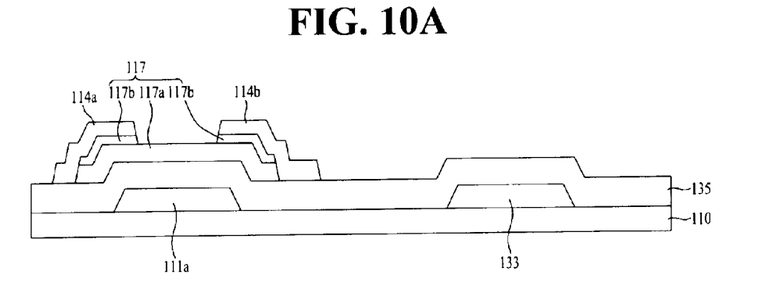
FIGS. 10A to 10C are sectional views illustrating a method for fabricating the liquid crystal display device according to the present invention.
Figure 10B:
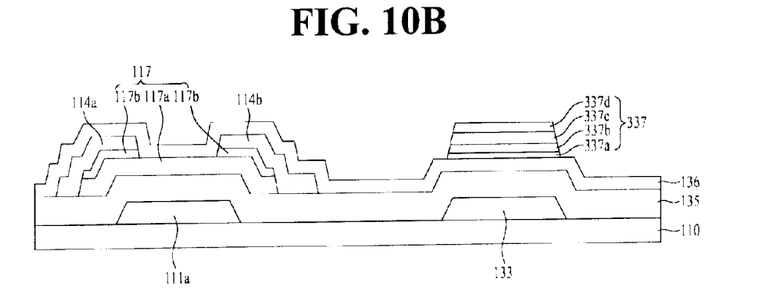
Figure 10C:
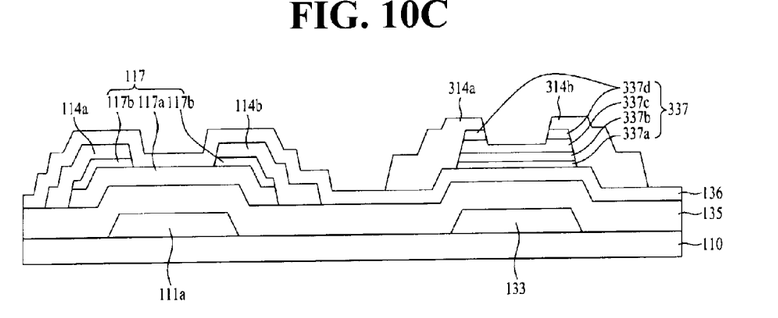

FIGS. 10A to 10C are sectional views illustrating a method for fabricating the liquid crystal display device according to the present invention.

The semiconductor layer of the sensing transistor includes a total of four layers.

Referring FIG. 6 and FIG. 10A, first, a gate line 111, a sensing line 113 and a common line 112 arranged parallel to one another, a pixel gate electrode 111a protruding from the gate line 111, and a sensing gate electrode 133 are formed on a first substrate 110.

Subsequently, a gate insulating film 135 is formed on the first substrate 110 such that it covers the gate electrodes 111a and 133.

Subsequently, a pixel semiconductor layer 117 is formed on the gate insulating film 135 such that it covers the pixel gate electrode 111a and a pixel source electrode 114a and a drain electrode 114b are formed on both sides of the pixel semiconductor layer 117 and in an upper region contacting the sides, respectively.

The semiconductor layer 117 has a stack-structure structure including an amorphous silicon layer 117a and an impurity layer 117b.

Subsequently, as shown in FIG. 10B, an interlayer film 136 is formed over the gate insulating film 135 including the pixel source/drain electrodes 114a/114b.

Subsequently, a sensing semiconductor layer 337 is formed on the protective film 136 formed on the sensing gate electrode 133.

As mentioned above, the sensing semiconductor layer 337 has a stack-structure structure including a first layer to a fourth layer 337a to 337d, i.e., i(amorphous silicon layer)/n (impurity layer)/i(amorphous silicon layer)/n(impurity layer).

Subsequently, as shown in FIG. 10C, sensing source/drain electrodes 314a/314b are formed at both sides of the sensing semiconductor layer 337 and in a portion adjacent to the sides. When the source/drain electrodes 314a/314b are patterned, the fourth layer 337d is entirely removed in a channel region (between the source/drain electrodes formed in the subsequent process) and the third layer 337c is partially removed.

The configuration shown in FIG. 10C is similar to that of FIG. 9B and serves the same function as that of FIG. 9B.

The liquid crystal display device of the present invention includes a backlight unit arranged in a lower region of the liquid crystal panel as a TFT-LCD module. The LCD further including an infrared LED as a light source of the backlight unit is provided with an infrared sensor to sense infrared light on a TFT substrate, and a switch TFT and a gate line to sequentially transfer capacitance to store sensed signals and electric charges of the signal-stored capacitance to the read-out line. In addition, a color filter of the LCD is provided with infrared filters composed of color pigments to block UV light emitted from an external source, to allow infrared light emitted from the backlight upon touch to be reflected from a touching material, to pass through the infrared filter and to be then sensed by the infrared sensor.

The liquid crystal display device and a method for fabricating the same have the following advantages.

First, the LCD device includes a sensing portion to sense touch in an in-cell manner and the sensing portion can be realized with a simple circuit structure in a pixel, thus realizing a display device which exhibits sensing function and enables decrease in thickness and weight and cost-savings.

Second, the LCD device can sense touch in an infrared manner and thus can be used stably without being affected by an external light.

Third, the LCD device emits infrared light and senses an amount of reflected light received on a touched surface to detect touch, thus enabling soft touch, reducing error, and exhibiting excellent touch sensitivity.

Fourth, the LCD device is provided with a sensing portion in a pixel and includes an infrared light-emitting region at one side of a backlight unit, thus realizing touch without increasing an area of the device and being applicable regardless of size.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:
    a liquid crystal panel including a first substrate and a second substrate facing each other, wherein a liquid crystal layer is interposed between the first substrate and the second substrate;
    an infrared sensor arranged on the first substrate;
    an infrared filter arranged corresponding to the infrared sensor arranged on the second substrate;
    a light guiding plate arranged under the first substrate;
    a first light source arranged on one side of the light guiding plate to emit white light;
    a second light source arranged on the other side of the light guiding plate to emit infrared light to the light guiding plate;
    a plurality of gate lines and a plurality of data lines crossing each other;
    a pixel transistor arranged at each crossing of the gate line and the data line;
    a common line and a sensing line arranged parallel to the gate line; and
    a read-out line arranged parallel to the data line,
    wherein the infrared sensor is formed between the common line, the sensing line and the read-out line,
    wherein the infrared sensor comprises:
        a sensing transistor connected to one side of the common line, the sensing transistor receiving reflected infrared light upon touch, to allow a photo-current to flow through the sensing transistor, wherein the sensing transistor comprises:
            a shielding pattern in the same layer as the gate line on the first substrate;
            a semiconductor layer comprising a stack-structure including an amorphous silicon layer and an impurity layer formed by interposing a gate insulating film on the shielding pattern;
            a source electrode and a drain electrode at both sides of the semiconductor layer, in the same layer as the data line; and
            a gate electrode arranged on an interlayer film covering the data line, the source electrode and the drain electrode;
        an infrared sensing capacitor arranged between the sensing transistor and the common line, the infrared sensing capacitor charged by the photo-current flowing through the sensing transistor; and
        a switching transistor interposed between the infrared sensing capacitor and the read-out line, the switching transistor receiving an operation signal from the sensing line and being switched, the switching transistor transferring electric charges charged from the infrared sensing capacitor to the read-out line.

2. The liquid crystal display device according to claim 1, wherein the infrared sensor senses amount of infrared light reflected upon touch of the second substrate through the infrared filter, with respect to infrared light emitted from the second light source.

3. The liquid crystal display device according to claim 1, wherein the gate electrode is electrically connected to a first signal-applied line.

4. The liquid crystal display device according to claim 1, wherein the sensing transistor comprises:
    a gate electrode in the same layer as the gate line on the first substrate;
    a semiconductor layer on the gate electrode including a first semiconductor layer pattern and a second semiconductor layer pattern arranged on the first semiconductor layer pattern, wherein the first semiconductor layer pattern is formed by interposing an insulation film covering the data line and is composed of a combination of an amorphous silicon layer and a first impurity layer, and the second semiconductor layer pattern of a second impurity layer; and
    a source electrode and a drain electrode arranged at both sides of the semiconductor layer.

5. The liquid crystal display device according to claim 4, wherein the second impurity layer and the first impurity layer include impurities of an identical type.

6. The liquid crystal display device according to claim 4, wherein the second impurity layer is formed only in the source electrode and the drain electrode.

7. The liquid crystal display device according to claim 1, wherein the second substrate comprises:
    a black matrix layer formed as a matrix in a non-pixel region; and
    a red pigment layer, a green pigment layer and a blue pigment layer arranged between the black matrix layer.

8. The liquid crystal display device according to claim 7, wherein the infrared filter includes a stack-structure of at least two or more of the red pigment layer, the green pigment layer and the blue pigment layer.

9. The liquid crystal display device according to claim 1, wherein the second light source always operates in an on-state.

10. The liquid crystal display device according to claim 1, wherein the second light source is synchronized with an operation signal of the sensing line.

11. A liquid crystal display device comprising:
- a liquid crystal panel including a first substrate and a second substrate facing each other, wherein a liquid crystal layer is interposed between the first substrate and the second substrate;
- an infrared sensor arranged on the first substrate;
- an infrared filter arranged corresponding to the infrared sensor arranged on the second substrate;
- a first polarizing plate adhered to the back surface of the first substrate;
- a second polarizing plate adhered to the back surface of the second substrate;
- a light guiding plate arranged under the first polarizing plate;
- a first light source arranged on one side of the light guiding plate to emit white light;
- a second light source arranged on the other side of the light guiding plate to emit infrared light to the light guiding plate;
- a plurality of gate lines and a plurality of data lines crossing each other;
- a pixel transistor arranged at each crossing of the gate line and the data line;
- a common line and a sensing line arranged parallel to the gate line; and
- a read-out line arranged parallel to the data line;
- wherein the infrared sensor is formed between the common line, the sensing line and the read-out line,
- wherein the infrared sensor comprises:
- a sensing transistor connected to one side of the common line, the sensing transistor receiving reflected infrared light upon touch, to allow a photo-current to flow through the sensing transistor, wherein the sensing transistor comprises:
  - a shielding pattern in the same layer as the gate line on the first substrate;
  - a semiconductor layer comprising a stack-structure including an amorphous silicon layer and an impurity layer formed by interposing a gate insulating film on the shielding pattern;
  - a source electrode and a drain electrode at both sides of the semiconductor layer, in the same layer as the data line; and
  - a gate electrode arranged on an interlayer film covering the data line, the source electrode and the drain electrode;
- an infrared sensing capacitor arranged between the sensing transistor and the common line, the infrared sensing capacitor charged by the photo-current flowing through the sensing transistor; and
- a switching transistor interposed between the infrared sensing capacitor and the read-out line, the switching transistor receiving an operation signal from the sensing line and being switched, the switching transistor transferring electric charges charged from the infrared sensing capacitor to the read-out line.

* * * * *